United States Patent
Cochin

(10) Patent No.: US 6,276,514 B1
(45) Date of Patent: Aug. 21, 2001

(54) TOOTHED WHEEL AND METHOD FOR TRANSFERRING COMPONENTS

(75) Inventor: François Cochin, Paris (FR)

(73) Assignee: ADS, Saint Quen I'Aumone (FR)

( * ) Notice: Subject to any disclaimer, the term of this patent is extended or adjusted under 35 U.S.C. 154(b) by 0 days.

(21) Appl. No.: 09/355,936

(22) PCT Filed: Dec. 14, 1998

(86) PCT No.: PCT/FR98/02714

§ 371 Date: Aug. 13, 1999

§ 102(e) Date: Aug. 13, 1999

(87) PCT Pub. No.: WO99/30994

PCT Pub. Date: Jun. 24, 1999

(30) Foreign Application Priority Data

Dec. 16, 1997 (FR) .................................................. 97 15926

(51) Int. Cl.$^7$ .................................................. B65G 47/26
(52) U.S. Cl. ..................................... 198/459.2; 198/481.1
(58) Field of Search ............................. 198/459.2, 478.1, 198/480.1, 481.1, 474.1, 475.1

(56) References Cited

U.S. PATENT DOCUMENTS

| | | | |
|---|---|---|---|
| 1,556,991 | * 10/1925 | Hippenmeyer | 198/480.1 |
| 1,941,152 | * 12/1933 | Noll | 198/459.2 |
| 1,985,897 | * 1/1935 | Huntar | 198/459.2 |
| 2,007,981 | * 7/1935 | Nordquist | 198/459.2 |
| 2,026,811 | * 1/1936 | Bach | 198/459.2 |
| 2,155,088 | * 4/1939 | Hopkins | 198/480.1 X |
| 4,114,347 | * 9/1978 | Morris et al. | 198/481.1 X |
| 4,239,116 | 12/1980 | Eisenberg et al. | 209/523 |
| 5,501,552 | 3/1996 | Simkowski | 406/52 |

FOREIGN PATENT DOCUMENTS

| | | |
|---|---|---|
| 0629569 | 12/1994 | (EP) . |
| 1196430 | * 11/1959 | (FR) .................................................. 198/480.1 |

* cited by examiner

Primary Examiner—James R. Bidwell
(74) Attorney, Agent, or Firm—Greenblum & Bernstein, P.L.C.

(57) ABSTRACT

Method and apparatus for transferring components which includes a wheel which can rotate between an arrival station and a discharge station, each station being located adjacent a periphery of the wheel. A plurality of independent peripheral teeth are pivotally mounted to the wheel via mounting spindles. The teeth are designed to carry along at least one component during a rotation of the wheel in a transfer direction. Each of the teeth can pivot in a direction opposite to the transfer direction, such that each tooth can release a component when there is resistance to rotation of the wheel.

40 Claims, 2 Drawing Sheets

TOOTHED WHEEL AND METHOD FOR TRANSFERRING COMPONENTS

BACKGROUND OF THE INVENTION

1. Field of the Invention

The invention relates to a toothed transfer wheel for components such as preforms or receptacles each component having a ring or neck fitted with a flange.

2. Description of Background and Relevent Information

In order to manufacture bottles or flasks or more generally receptacles made of a thermoplastic material, it is known to use preforms obtained, for example, by injection and which are in the form of a tubular body, closed at one end while its other open end is provided with a ring or neck generally fitted with a flange.

The bodies of the preforms must be subjected to a thermal treatment before being expanded during a moulding operation by blowing or steam blowing.

In a manufacturing line of this type, the preforms and/or the receptacles obtained by blowing circulate from one manufacturing station to another and even within certain stations themselves such as, for example, a thermal oven for preforms.

In order to transport the preforms and/or the receptacles, it is known to hold them up and to guide them on rails on which they are supported by their flanges.

In certain cases, it is necessary to use ring and pinion gearing, for example, to pass preforms from a supply station provided with an inclined rail to the heat treatment oven and it is then known to use a toothed transfer wheel, where the preforms are held up by their flanges, during rotation of the wheel, between respectively arrival and discharge areas or stations provided close to the periphery of the wheel.

The toothed wheel is formed as a single component and in certain cases it can happen that a preform or a receptacle gets jammed between the leading face of a tooth and the guide rail, causing locking of the wheel and because of that, jamming of the other devices driven by the same motor (a single motor is generally used for the different devices because of problems of synchronisation), such as, for example, the system for moving the preforms forward into the heat treatment oven, which clearly causes preforms which have spent too long in the oven to be lost and a loss of the time spent restoring the operation.

Even if several independent motors are used to prevent loss at a station located downstream in the manufacturing line, in addition to the problem of the extra cost and all the difficulties of synchronisation and the subsequent resetting of the motors, the jamming of the transfer wheel still remains very troublesome.

SUMMARY OF THE INVENTION

This is why the invention provides for a toothed transfer wheel that is notably remarkable in that it is provided with a plurality of independent peripheral teeth which are pivotably mounted on spindles and which are each designed to transport a preform or receptacle during the rotation of the wheel while each tooth is able to pivot in the direction that is opposite to the direction of rotation of the wheel and to release the preform or receptacle in the event of resistance to the driving force being greater than the force of an elastic recall means provided to urge said tooth into its normal transporting position.

In this way, there is no longer any jamming problem and also therefore no loss of a large number of products in a manufacturing station, even if for certain stations (for example a moulding station), the detection of a missing preform in the line causes the scrapping of a certain relatively reduced number of said preforms because of handling of the preforms by batch.

Advantageously, the teeth are embedded one inside the other and between them have contact surfaces in the shape of an S, while their pivoting spindle is offset forwards in relation to the direction of rotation of the wheel in such a way that each tooth is able to pivot through co-operation of its shapes, respectively concave and convex, with the shapes, respectively convex and concave of the teeth which are either side of it and in this case, each tooth can have, for example, a heel on the rear end of its S shape, which ensures that it is checked and set in position on the following tooth in relation to the direction of rotation of the wheel and so that the following tooth is stationary when pivoting has occurred or is in progress.

According to one embodiment, the wheel includes a disc which acts as a pivoting bearing surface for each tooth, in which is freely mounted the pivoting spindle for the tooth, the spindle being rigidly fixed in rotation with the tooth, while the elastic recall for each tooth is, for example, constituted by a coil torsion spring positioned around the pivoting spindle of the tooth and one end of which is fixed to the disc while the other end is fixed in rotation with the pivoting spindle.

In this case, according to one embodiment, the end of the torsion spring fixed in rotation with the pivoting spindle, is fixed between a part of the spindle and a part of a sleeve which surrounds the spring and which is fixed in rotation with the spindle.

The invention will be understood and other particular features will become apparent on reading the description that follows and which makes reference to the appended drawings in which:

DETAILED DESCRIPTION OF THE INVENTION

Figure 1:
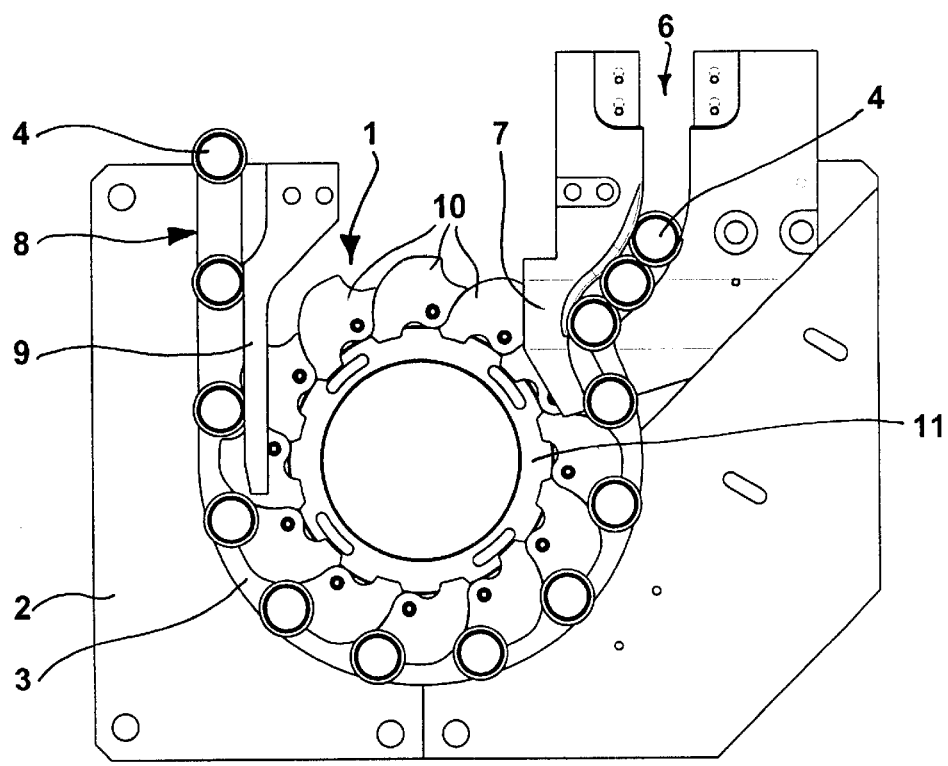
FIG. 1 is a plan view from above of a wheel according to the invention, arranged in a frame.

The toothed wheel 1 shown in the drawings is mounted so that it rotates, here in a clockwise direction, in a frame 2, which forms, with said wheel a circular track 3 for preforms 4, though it may also be used with finished or semi-finished receptacles.

Figure 4:
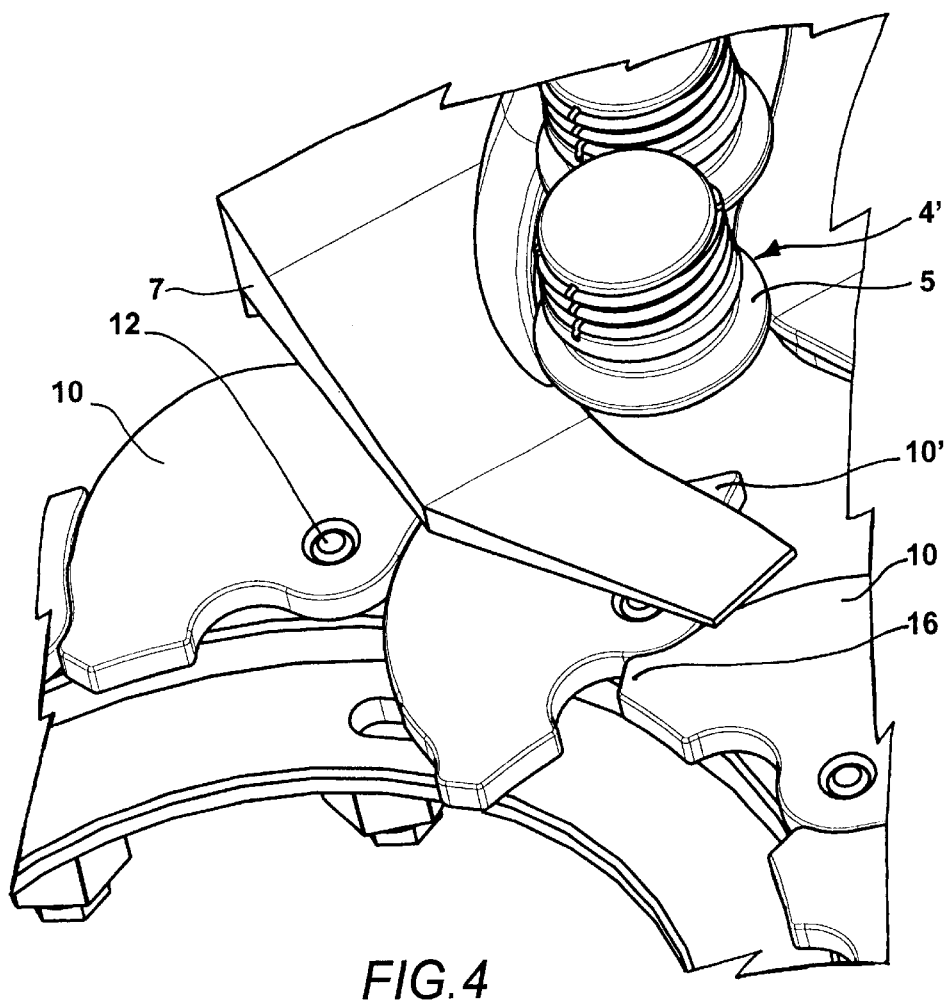
FIG. 4 is an enlargement of a part of FIG. 2.

Each preform as the drawings show, includes a ring or neck fitted with a flange, such as the flange 5 clearly visible in FIG. 4, though it is clear that instead of preforms, it may be concerned with finished receptacles.

The wheel shown is, for example, provided to be used as a ring and pinion gear between a station 6 for supplying preforms which arrive, for example on an inclined rail, possibly fitted here with a guide 7, and a discharge station 8, fitted here with a guide 9, from where the preforms are then transported to a station downstream such as a reheating oven (not shown).

In the example shown, the preforms arrive and are discharged in a way that is substantially tangential to the wheel 1.

It should be understood that the preforms 4 are guided and held during their movement by their flanges 5.

The circulation track 3 is constituted by a circular part of the frame 2 and the periphery of the wheel 1 which comprises a plurality of teeth 10 profiled as shown in the drawings to transport each preform from station 6 to station 8.

Each tooth is pivotably mounted on an annular disc 11, which is rotatably mounted in the frame 2.

Figure 3:
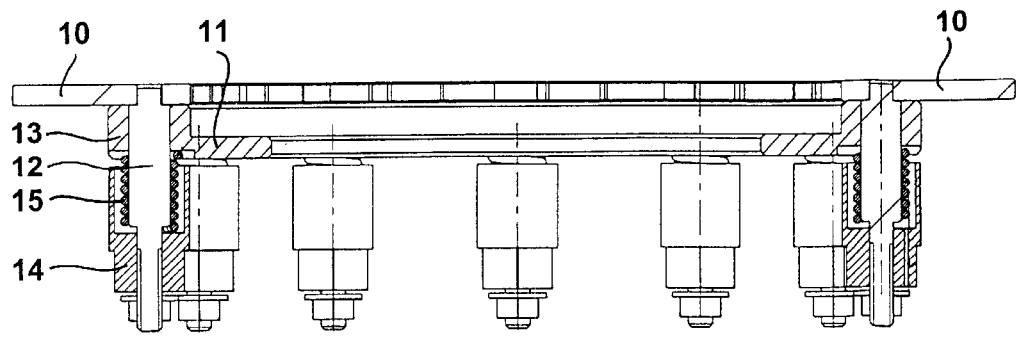
FIG. 3 is a diametrical cross section of the wheel of FIGS. 1 and 2.

To this effect, each tooth 10 is rigidly fixed in rotation to a spindle 12, particularly visible in FIG. 3, the spindle being mounted to pivot freely in a bearing 13 of the disc 11.

The pivot spindle 12 for each tooth is rigid fixed in rotation to a sleeve 14 while a coil torsion spring 15 is arranged inside the sleeve and around the spindle 12, its ends being fixed respectively to the disc 11 and the spindle 12 and/or the sleeve 14 (in fact here, said end is locked between a part of the spindle 12 and a part of said sleeve 14).

The spring 15 is such that it urges the tooth 10 to take up its working position, that is to say, according to the drawings, by exerting a recall force in the same clockwise direction as the rotation of the wheel 1.

As the drawings show well, the teeth are embedded one in the other and each has a front profile and a rear profile that form S-shaped contact surfaces while the pivot spindle is offset towards the front in relation to the direction of rotation of the wheel 1.

Figure 2:
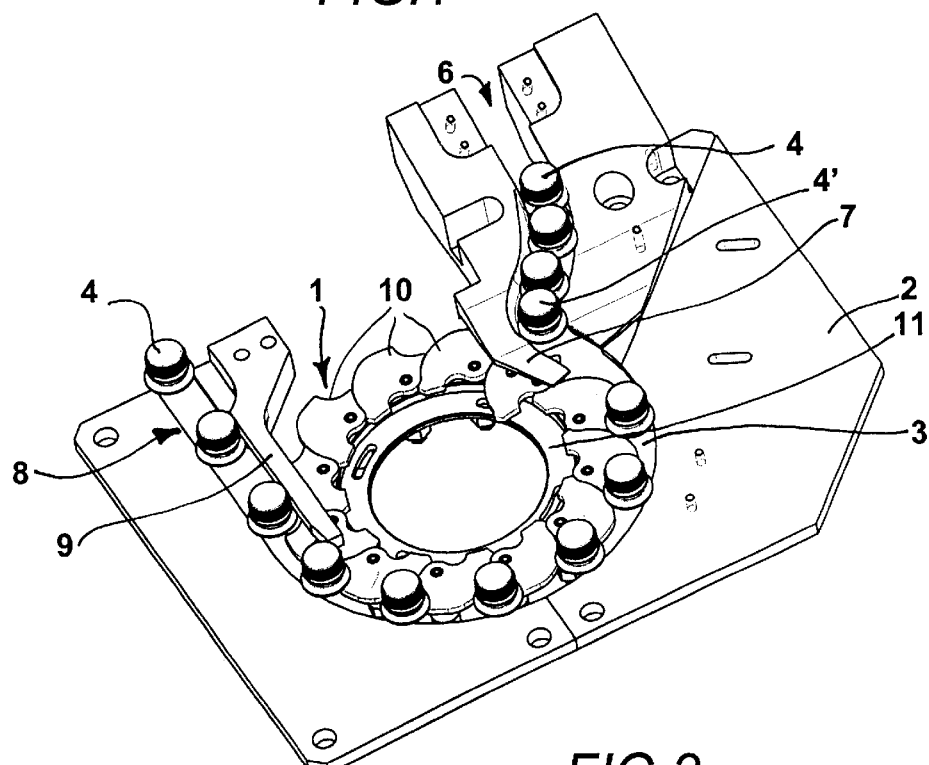
FIG. 2 is a perspective view of the assembly shown in FIG. 1 a tooth having pivoted.

These particularly original shapes which have been studied thereby allow each tooth to pivot towards the inside in an anti-clockwise direction against the urging force of the spring 15, the concave and convex parts of a tooth being able to move within the respectively convex and concave parts of the teeth either side of them, as is shown clearly in FIGS. 2 and 4 which shows a tooth 10' that has pivoted between two teeth 10.

In addition, it is understood that the rear heel of one tooth (rear in relation to the direction of rotation of the wheel), which has been given reference number 16 in FIG. 4 and which is constituted by the concave end of the S-shape, allows each tooth to be checked and to lock itself into position on the following tooth (still in relation to the direction of rotation) so that said following tooth is stationary when pivoting has occurred or is in progress.

If FIGS. 2 and 4 show a tooth 10' that has pivoted, this is because of a preform 4' which because of a technical hitch, has not been able to be picked up correctly by the tooth 10'.

If tooth 10' had not been mounted in a pivoting manner, it is understood that the preform 4' would have remained jammed between tooth 10' and its guide rail, causing rotation of the wheel 1 to be prevented with all the difficulties mentioned above.

Here, on the contrary, following pivoting of the tooth 10', the preform 4' will be carried along by one of the following teeth possibly after certain of them have pivoted unless the operator removes said preform, it being understood that each tooth, having pivoted, will take up its transporting position again under the effect of the recall spring 15 (FIG. 3).

Finally, it can also be seen in the drawings that the turning angle here is about 180° but it could be 90° or less.

What is claimed is:

1. A toothed wheel for transferring, one of, preforms and receptacles each including a ring or a neck fitted with a flange, said preforms or receptacles being supported by their flanges during rotation of said toothed wheel, between an arrival area and a discharge area, each of which is located close to a periphery of said toothed wheel, said toothed wheel comprising;
    a plurality of independent peripheral teeth pivotally mounted on a spindle, each of said teeth being designed to carry along a preform or receptacle during the rotation of said toothed wheel while each tooth is able to pivot in a direction opposite to a direction of rotation of said toothed wheel and to release said preform or receptacle if a resistance to a driving force is greater than a force of an elastic recall means which urges said each tooth towards a normal transporting position,
    wherein at least two adjacent teeth have closely arranged corresponding concave and convex surfaces such that the concave surface of one adjacent tooth is engagable with the convex surface of the other adjacent tooth.

2. The toothed transfer wheel of claim 1, wherein each of said teeth is embedded one inside the other thereby forming contact surfaces between them in the shape of an S, and wherein said pivoting spindle of each tooth is offset towards a front edge of said tooth in relation to said direction of rotation of said toothed wheel in such a way that each tooth is able to pivot through cooperation of said S-shaped surfaces, said S-shaped surfaces being respectively concave and convex with respect to adjacent teeth on either side of it.

3. The toothed transfer wheel of claim 2, wherein each tooth has a heel at a rear end of said S-shape, said heel ensuring that it is checked and set in position on a following tooth in relation to said direction of rotation of said toothed wheel such that said following tooth is stationary when either pivoting has occurred or is in progress.

4. The toothed transfer wheel of claim 1, wherein said toothed wheel further comprises a disc which provides a pivoting bearing surface for each tooth such that each pivoting spindle of said tooth is freely mounted, said spindle being rigidly fixed in rotation to said tooth.

5. The toothed transfer wheel of claim 4, wherein said elastic recall means for each tooth is a coil torsion spring arranged around said pivoting spindle of said tooth, one end of which is rigidly fixed to said disc and another end of which is rigidly fixed in rotation to said pivoting spindle.

6. A toothed wheel for transferring, one of, preforms and receptacles each including a ring or a neck fitted with a flange, said preforms or receptacles being supported by their flanges during rotation of said toothed wheel, between an arrival area and a discharge area, each of which is located close to a periphery of said toothed wheel, said toothed wheel comprising;
    a plurality of independent peripheral teeth pivotally mounted on a spindle, each of said teeth being designed to carry along a preform or receptacle during the rotation of said toothed wheel while each tooth is able to pivot in a direction opposite to a direction of rotation of said toothed wheel and to release said preform or receptacle if a resistance to a driving force is greater than a force of an elastic recall means which urges said each tooth towards a normal transporting position,
    wherein said toothed wheel further comprises a disc which provides a pivoting bearing surface for each tooth such that each pivoting spindle of said tooth is freely mounted, said spindle being rigidly fixed in rotation to said tooth,
    wherein said elastic recall means for each tooth is a coil torsion spring arranged around said pivoting spindle of said tooth, one end of which is rigidly fixed to said disc and another end of which is rigidly fixed in rotation to said pivoting spindle, and wherein said end of said coil torsion spring that is rigidly fixed in rotation to said pivoting spindle is fixed between a part of said pivoting spindle and a part of a sleeve which surrounds said spring and which is rigidly fixed in rotation with said pivoting spindle.

7. An apparatus for transferring components comprising:
a wheel which is rotatable between an arrival station and a discharge station, each station being located adjacent a periphery of said wheel;
a plurality of independent peripheral teeth pivotally mounted via a spindle to said wheel;
said teeth being designed to carry along at least one component during a rotation of said wheel;
wherein each of said plurality of said teeth is pivotable in a direction opposite to said wheel rotation and wherein each tooth releases said at least one component when there is substantial resistance to rotation of said wheel, and
wherein at least two adjacent teeth have closely arranged corresponding concave and convex surfaces such that the concave surface of one adjacent tooth is engagable with the convex surface of the other adjacent tooth.

8. The apparatus of claim 7, wherein said at least one component comprises one of a preform and a receptacle.

9. The apparatus of claim 7, wherein each of said teeth is biased to resist pivoting in a direction opposite to said rotation direction.

10. The apparatus of claim 9, wherein each of said teeth is pivotally biased by a biasing force sufficient to release said at least one component when said wheel encounters a substantial resistance to rotation force, such that said release occurs when said resistance to rotation force is greater than said biasing force.

11. The apparatus of claim 7, wherein:
each of the at least two adjacent teeth are shaped with corresponding concave and convex surfaces which are adjacent one another, said shape corresponding to an S-shape;
said pivoting spindle is offset from a center of said tooth; and
each of the at least two adjacent teeth being pivotable independently through sliding between said corresponding concave and convex adjacent surfaces.

12. The apparatus of claim 7, wherein each tooth comprises an S-shaped configuration having a heel at one end which abuts an adjacent tooth, said heel forming a stop against pivoting in said direction of wheel rotation.

13. The apparatus of claim 7, wherein said wheel comprises a pivoting bearing surface for said plurality of pivoting teeth and said plurality of teeth are each are pivotally mounted to said wheel with a spindle, each of said spindles being fixedly connected each of said teeth.

14. The apparatus of claim 7, wherein each tooth is pivotally biased by a spring mounted on said spindle.

15. The apparatus of claim 14, wherein one end of said spring is fixed to said tooth and another end of said spring is fixed to said spindle.

16. The apparatus of claim 14, wherein said spring comprises a torsional coil spring.

17. An apparatus for transferring components comprising:
a wheel which is rotatable between an arrival station and a discharge station, each station being located adjacent a periphery of said wheel;
a plurality of independent peripheral teeth pivotally mounted via a spindle to said wheel;
said teeth being designed to carry along at least one component during a rotation of said wheel;
wherein each of said plurality of said teeth is pivotable in a direction opposite to said wheel rotation and wherein each tooth releases said at least one component when there is substantial resistance to rotation of said wheel,
wherein each tooth is pivotally biased by a spring mounted on said spindle, and
wherein at least two adjacent teeth have closely arranged corresponding concave and convex surfaces such that the concave surface of one adjacent tooth is engagable with the convex surface of the other adjacent tooth.

18. An apparatus for transferring a component from a supply position to a discharge position comprising:
a frame having an outer component guide surface;
a wheel rotatably mounted with respect to said frame;
an entry guide located on one end of said frame leading to said supply position;
an exit guide located on another end of said frame leading to said discharge position;
a plurality of teeth pivotally mounted on said wheel;
a component travel path comprising said outer component guide surface and a component engaging surface on at least one tooth;
wherein said component is engaged by said at least one tooth at a position adjacent said entry guide and moved to a position adjacent said exit guide when said wheel is rotated in a transfer direction, and
wherein at least two adjacent teeth have closely arranged corresponding concave and convex surfaces such that the concave surface of one adjacent tooth is engagable with the convex surface of the other adjacent tooth.

19. The apparatus of claim 18, wherein said component comprises one of a preform and a receptacle.

20. The apparatus of claim 18, wherein said at least one tooth is biased to resist pivoting in a direction opposite to said transfer direction.

21. The apparatus of claim 20, wherein said at least one tooth is pivotally biased by a biasing force sufficient to release said component when said wheel encounters a substantial resistance to rotation force, such that said release occurs when said resistance to rotation force is greater than said biasing force.

22. The apparatus of claim 18, wherein:
each of the at least two adjacent teeth being shaped with corresponding concave and convex surfaces which are adjacent one another, said corresponding concave and convex surfaces taking a form of an S-shape;
each of the at least two adjacent teeth being pivoted on a spindle which is offset from a center of said tooth,
wherein each adjacent tooth is pivotable independently through sliding between said corresponding concave and convex adjacent surfaces.

23. The apparatus of claim 18, wherein each tooth of said plurality of teeth comprises an S-shaped configuration having a heel at one end which abuts an adjacent tooth, said heel forming a stop against pivoting rotation in said transfer direction.

24. The apparatus of claim 18, wherein said wheel comprises a pivoting bearing surface for said plurality of pivoting teeth and said plurality of teeth are each pivotally mounted to said wheel with a spindle, each of said spindles being fixedly connected to each of said teeth.

25. The apparatus of claim 18, wherein each tooth of said plurality of said teeth is pivotally biased by a spring which is mounted on a spindle.

26. The apparatus of claim 25, wherein one end of said spring is fixed to a tooth and another end of said spring is fixed to said spindle.

27. The apparatus of claim 25, wherein said spring comprises a torsional coil spring.

28. An apparatus for transferring a component from a supply position to a discharge position comprising:
   a frame having an outer component guide surface;
   a wheel rotatably mounted with respect to said frame;
   an entry guide located on one end of said frame leading to said supply position;
   an exit guide located on another end of said frame leading to said discharge position;
   a plurality of teeth pivotally mounted on said wheel;
   a component travel path comprising said outer component guide surface and a component engaging surface on at least one tooth;
   wherein said component is engaged by said at least one tooth at a position adjacent said entry guide and moved to a position adjacent said exit guide when said wheel is rotated in a transfer direction,
   wherein each tooth of said plurality of said teeth is pivotally biased by a spring which is mounted on a spindle, and
   wherein one end of said spring is fixed to a tooth and another end of said spring is fixed between said spindle and a sleeve mounted on said spindle, such that said sleeve surrounds at least a portion of said spring.

29. A method of transferring a component from a supply position to a discharge position comprising:
   engaging a component with a tooth engaging surface of one tooth of a toothed transfer wheel having a plurality of pivotally mounted teeth, said component being engaged at a position adjacent an entry guide located on one end of a frame;
   moving said component through a circular travel path in a transfer direction by rotating said toothed wheel with respect to said frame, said travel path being defined by an outer component guide surface of said frame and said toothed wheel;
   disengaging said component at a discharge position adjacent an exit guide located on another end of said frame,
   wherein at least two adjacent teeth have closely arranged corresponding concave and convex surfaces such that the concave surface of one adjacent tooth is engagable with the convex surface of the other adjacent tooth.

30. The method of claim 29, wherein said component comprises one of a preform and a receptacle.

31. The method of claim 29, wherein said moving is accomplished with a tooth which is biased to resist pivoting in a direction opposite to said transfer direction.

32. The method of claim 31, wherein said moving is accomplished with teeth which are pivotally biased by a biasing force sufficient to release said component when said wheel encounters a resistance to rotation force, such that said release occurs when said resistance to rotation force is greater than said biasing force.

33. The method of claim 29, further comprising:
   moving a plurality of components with said toothed wheel, said plurality of teeth being adjacent one another and each tooth having a shape which includes a concave and a convex surface, said convex surface of one adjacent tooth corresponding to said concave surface of an adjacent tooth, said shape corresponding to an S-shape.

34. The method of claim 33, wherein each tooth is pivoted on a spindle which is offset from a center of said tooth and wherein each tooth can pivot independently of one another through sliding between said corresponding concave and convex adjacent surfaces.

35. The method of claim 34, wherein said shape includes a heel at one end of said tooth, said heel abutting said adjacent tooth and forming a stop against pivoting rotation in said transfer direction.

36. The method of claim 29, wherein said toothed wheel provides a supporting and pivoting bearing surface for said plurality of pivoting teeth, such that each of said plurality of teeth is mounted to said toothed wheel with a spindle which fixedly connects each of said spindles to each of said teeth.

37. The method of claim 29, wherein said moving includes pivotally biasing each of said plurality of said teeth using a spring which is mounted on a spindle.

38. An apparatus for transferring a component from a supply position to a discharge position comprising:
   a frame having an outer component guide surface;
   a wheel rotatably mounted with respect to said frame;
   an entry guide located on one end of said frame leading to said supply position;
   an exit guide located on another end of said frame leading to said discharge position;
   a plurality of teeth pivotally mounted to said wheel using a spindle;
   each of said teeth comprising an S-shaped configuration and a heel;
   each of said teeth being biased to pivot in a transfer direction;
   a component travel path comprising said outer component guide surface and a component engaging surface on at least one tooth;
   wherein said component is engaged by said at least one tooth at a position adjacent said entry guide and moved to a position adjacent said exit guide when said wheel is rotated in said transfer direction, and
   wherein at least two adjacent teeth have closely arranged corresponding concave and convex surfaces such that the concave surface of one adjacent tooth is engagable with the convex surface of the other adjacent tooth.

39. A method of transferring a component from a supply position to a discharge position comprising:
   engaging a component flange with a tooth engaging surface of one tooth of a toothed transfer wheel having a plurality of pivotally mounted teeth, said component being engaged at a position adjacent an entry guide located on one end of a frame and said plurality of teeth having, an S-shaped configuration, a heal, and being pivotally biased in a travel direction;
   moving said component through a circular travel path in a transfer direction by rotating said toothed wheel with respect to said frame, said moving corresponding to sliding contact between said component flange and an outer component guide surface of said frame;
   disengaging said component flange at a discharge position adjacent an exit guide located on another end of said frame after said component has been rotated to said discharge position,
   wherein at least two adjacent teeth have closely arranged corresponding concave and convex surfaces such that the concave surface of one adjacent tooth is engagable with the convex surface of the other adjacent tooth.

40. An apparatus for transferring components comprising:

a wheel which is rotatable between an arrival station and a discharge station, each station being located adjacent a periphery of said wheel;

a plurality of independent peripheral teeth pivotally mounted via a spindle to said wheel;

at least one of said plurality of teeth being adapted to carry along at least one component during a rotation of said wheel;

at least one of the plurality of teeth being adapted to release said at least one component when there is substantial resistance to rotation of said wheel;

at least one of said plurality of said teeth being pivotable in a direction opposite to said wheel rotation; and at least two adjacent teeth have closely arranged corresponding engaging surfaces, wherein an engaging surface of one of the at least two adjacent teeth engages an engaging surface of another of the at least two adjacent teeth.

* * * * *